(12) United States Patent
Jungert et al.

(10) Patent No.: US 8,752,899 B2
(45) Date of Patent: Jun. 17, 2014

(54) BACKREST FOR A MOTOR VEHICLE

(71) Applicant: Dr. Ing. h.c.F. Porsche Aktiengesellschaft, Stuttgart (DE)

(72) Inventors: Dieter Jungert, Weissach (DE); Philip Kottmann, Goeppingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/658,952

(22) Filed: Oct. 24, 2012

(65) Prior Publication Data

US 2013/0099544 A1 Apr. 25, 2013

(30) Foreign Application Priority Data

Oct. 24, 2011 (DE) ...................... 20 2011 054 737 U

(51) Int. Cl.
*B60N 2/48* (2006.01)

(52) U.S. Cl.
CPC ............ *B60N 2/4817* (2013.01); *B60N 2/4814* (2013.01)
USPC ....................................................... 297/410

(58) Field of Classification Search
USPC .......................................... 297/410, 391, 464
See application file for complete search history.

(56) References Cited

U.S. PATENT DOCUMENTS

| 4,466,663 | A | | 8/1984 | Oishi et al. |
| 5,711,579 | A | * | 1/1998 | Albrecht ...................... 297/410 |
| 2012/0098315 | A1 | | 4/2012 | Wahlers et al. |

FOREIGN PATENT DOCUMENTS

| DE | 33 23 649 | | 1/1983 |
| DE | 20 2009 013 635 | | 2/2010 |
| DE | 102009024487 | A1 * | 12/2010 |
| DE | 10 2010 060 076 | | 4/2012 |
| JP | 61-030434 | | 2/1986 |
| JP | 63-77549 | | 5/1988 |
| JP | 63-179845 | | 11/1988 |
| JP | 3-74844 | | 7/1991 |
| JP | 3-85949 | | 8/1991 |
| JP | 4-3053 | | 1/1992 |

OTHER PUBLICATIONS

German Search Report of Jun. 20, 2012.

* cited by examiner

*Primary Examiner* — Milton Nelson, Jr.
(74) *Attorney, Agent, or Firm* — Gerald E. Hespos; Michael J. Porco; Matthew T. Hespos

(57) ABSTRACT

A backrest for a motor vehicle seat has a head restraint that is height adjustable with the aid of a guide. A transverse strut connected fixedly at an upper region of the backrest. The guide has a guiding device that is attached fixedly to the transverse strut and guides a guiding element that is attached to and integrated in the head restraint. The guide (22) is assigned a locking unit (50), with a first locking part (51) that is fastened to the transverse strut (18), and a second locking part (52) that is fastened to the head restraint (4). The two locking parts (51, 52) interact according to a latch and hole principle.

15 Claims, 2 Drawing Sheets

BACKREST FOR A MOTOR VEHICLE

CROSS REFERENCE TO RELATED APPLICATION

This application claims priority under 35 USC 119 to German Patent Appl. No. 10 2011 054 737.1 filed on Oct. 24, 2011, the entire disclosure of which is incorporated herein by reference.

BACKGROUND OF THE INVENTION

1. Field of the Invention

The invention relates to a backrest for a motor vehicle seat with a head restraint that is height adjustable.

2. Description of the Related Art

DE 20 2009 013 635 U1 discloses a head restraint that is height adjustable manually by means of a latching rod that interacts with an adjustable catch. The backrest of the vehicle seat that supports the head restraint has two guide rods. One end of each guide rod is fixed in the backrest and the other ends are connected to each other by a yoke. The head restraint slides along the guide rods when the head restraint is adjusted in height manually. However, there is the problem in that the lower region of the head restraint has two holes from which the guide rods emerge. In addition, depending on the latching position of the head restraint, guide rod sections that differ in length are visible. An esthetically satisfactory solution therefore is not produced.

DE 32 23 649 C2 discloses a head restraint with additional arms. Each arm holds a rod on which bearings are provided and the bearings slide along the rods during displacement of the head restraint. This constitutes a structurally complicated solution.

The assignee of the subject invention also is the assignee of DE 10 2010 060 076.8. This earlier application is not prior art, but discloses a backrest with an aesthetically satisfactory solution to the height adjustment of the head restraint. However, only motorized adjustment possibilities are provided here.

It is therefore the object of the invention to provide the backrest an aesthetically attractive, functional, manually adjustable head restraint.

SUMMARY OF THE INVENTION

The invention relates to a head restraint with a guide that has a locking unit that has a first locking part fastened to a transverse strut and a second locking part fastened to the head restraint. The two locking parts interact according to a latch and hole principle. The backrest and head restraint provide an aesthetically attractive visual appearance of an integrated head restraint. A manual means also is provided for adjusting the head restraint is also provided. The manual adjustment means is structurally simple and visually attractive.

The guide includes a guiding device that is attached fixedly to the transverse strut of the backrest. The guiding device preferably is a bearing, such as a sliding bearing. The guide also includes a guiding element, such as a guide rod that is attached to the head restraint and is guided by the guiding devices to ensure a high degree of stability.

Particularly reliable guidance of the head restraint is produced by using two guide devices. The two guide devices preferably are provided on left and right sides of the head restraint to protect against twisting of the head restraint.

In contrast to the prior art, the bearings are attached fixedly to the transverse strut of the backrest. The head restraint encloses the bearings so that the bearings are covered completely by the head restraint in both an upper end position and a lower end position of the head restraint. Guide rods are attached fixedly to the head restraint and are guided by the bearings when the head restraint is adjusted. This arrangement provides a visually attractive appearance and permits greater stability of the head restraint because a lever arm acting on the head restraint is reduced in size by due to the short distances between the respective bearings and guide rods. The locking unit comprises two locking parts interacting in a matching manner. Thus, the advantages of the backrest are retained even if the head restraint has a manual height adjustment means.

One of the two locking parts enclosed by the locking unit may be a latching plate. The latching plate has at least one hole, but preferably more than one hole, for receiving the latch or the latches of a complementary locking part interacting with the latching plate. The latching plate preferably is attached to the transverse strut of the backrest to increase the locking stability.

One of the two locking parts enclosed by the locking unit may be a separator. The separator preferably comprises a plurality of latches, and thus permits simple adjustment of the head restraint with simultaneously securely locking a complementary locking part that interacts with the separator.

The sequence of movement during the manual height adjustment of the head restraint is simplified if the separator extends parallel to the guiding elements, i.e. guide rods. In this case, the separator is displaced in a simple manner in the direction of movement of the head restraint during the manual adjustment and is locked in a desired end position of the head restraint by the complementary locking part.

The separator may be a rotatably mounted separator that is assigned a slider. The separator is rotated as the slider is displaced so that the locking unit is locked or unlocked.

The slider preferably is operated by a pushbutton key on the outside of the head restraint. The pushbutton key can be actuated for manually adjusting the height of the head restraint. Activation of the slider rotates the separator out of the locked starting position so that the locking unit is unlocked. Thus, simple manual height adjustment of the head restraint is possible while the pushbutton key is actuated. The separator rotates back into the locked starting position when the pushbutton key is released so that the locking unit is locked in a new desired position of the head restraint.

The separator preferably is pre-stressed mechanically by a spring for further simplifying the operation. This reduces the effort required to actuate the separator.

The transverse strut and the backrest preferably are a single part, in particular a light metal casting, that can be can be manufactured economically.

Further advantages, features and details of the invention emerge from the description below which is described in more detail with reference to the drawing.

DETAILED DESCRIPTION OF THE PREFERRED EMBODIMENTS

Figure 1:
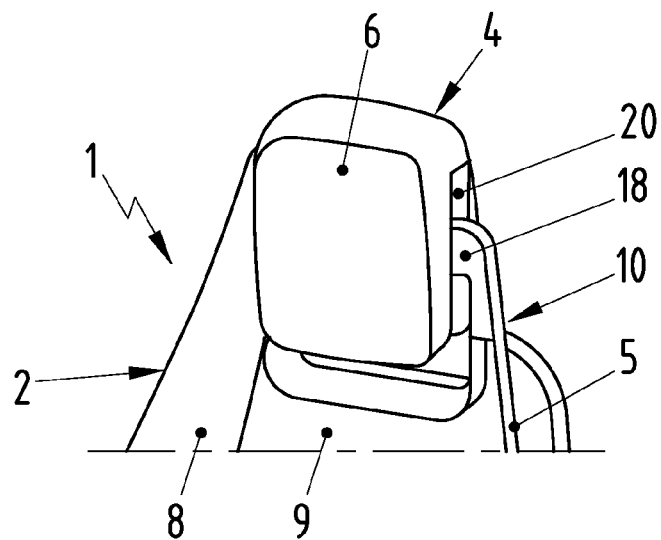
FIG. 1 is a perspective view of an upper section of a backrest of the type in question with a height adjustable head restraint.
Figure 2:
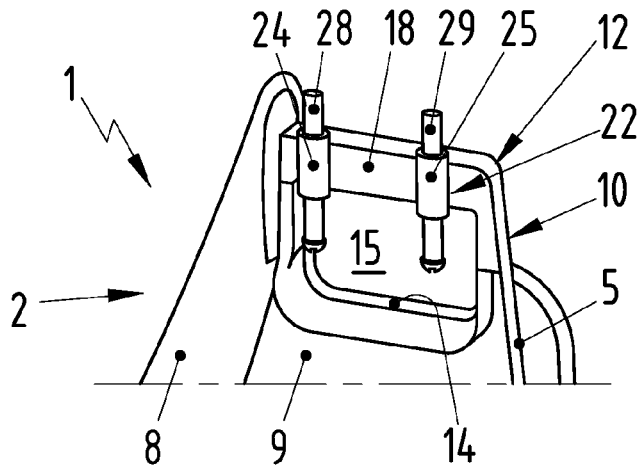
FIG. 2 is the same view as in FIG. 1, with the guide for the height adjustment in the interior of the head restraint.

The various figures show part of a vehicle seat 1 with the upper end of a backrest 2. A head restraint 4 is attached in a height adjustable manner to the backrest 2. The head restraint 4 also preferably is adjustable in a longitudinal direction of the vehicle.

The backrest 2 comprises a backrest support 5 that is padded by padded parts 8, 9. The head restraint 4 is padded in a similar manner by padding 6. A supporting structure 10 with a bow 12 emerges from the backrest support 5. The bow 12 is of substantially U-shape and borders a clearance 15 together with an upper edge of the seat back part 14 of the supporting structure 10. The backrest support 5 and the supporting structure 10 preferably are formed integrally or unitarily with the bow 12 as a light metal casting.

The bow 12 has a transverse strut 18 that at the upper end of the backrest 2. The transverse strut 18 is connected fixedly to the backrest support 5 via the supporting structure 10 and extends in a transverse direction of the motor vehicle. As shown in FIG. 1, the transverse strut 18 is within the head restraint 4. The padding of the head restraint 4 consequently extends between the upper and lower boundaries of the head restraint 4. To this end, a slot 20 extends into the interior of the head restraint 4. The transverse strut 18 is covered laterally on the outside by the padded part 8.

The height adjustment of the head restraint 4 is made possible by a guide 22 that comprises two guiding devices 24, 25. The guiding devices 24, 25 are sliding bearings that are connected fixedly to the transverse strut 18, for example by welding. Guide rods 28, 29 are guided in a height adjustable manner in the guiding devices 24, 25. The guide rods 28, 29 are fastened at their ends on the inside to the upper and lower parts 40a and 40b of the head restraint to form a frame 40 that defines a supporting structure in the interior of the head restraint 4.

The heat restraint 4 can be adjusted manually by a user, and the position of the height adjustment of the head restraint 4 that is desired by the user is locked by a locking unit 50. The locking unit 50 comprises a latching plate 51 as first locking part that is fastened to the transverse strut 18. The latching plate 51 has a plurality of holes or depressions arranged one under another. The holes or depressions are provided for selectively receiving latches of a separator 52 as a second locking part. The separator 52 is fastened rotatably to the lower side of the supporting structure 42 of the head restraint 4 and has a plurality of latches that can best be seen in FIGS. 4 and 6. The latches of the separator 52 are spaced from one another by equal distances that correspond precisely to the distance between the depressions or holes in the latching plate 51. Thus, there are plural defined positions in which the separator 52 can locked to the latching plate 51.

Figure 3:
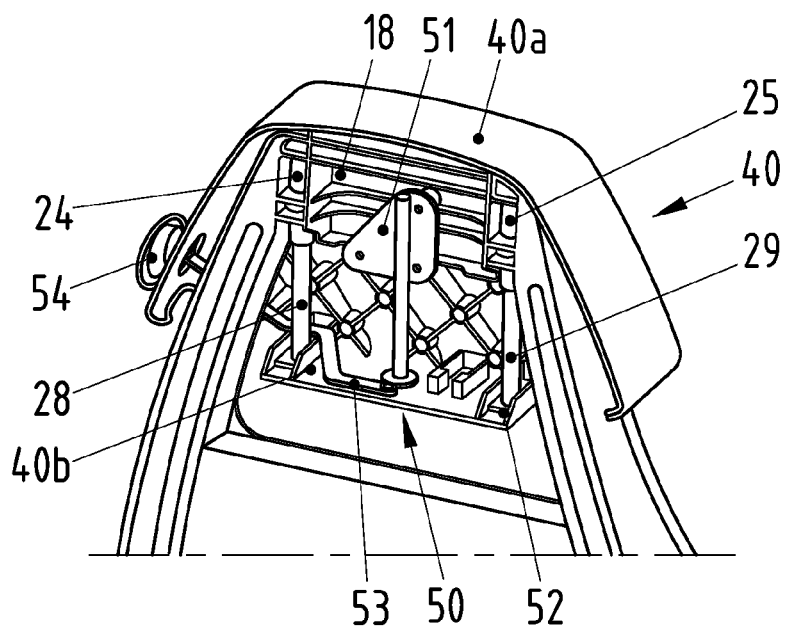
FIG. 3 is a perspective view of an upper section of a backrest according to the invention with a manually height adjustable head restraint and a locking device in the locked state.
Figure 4:
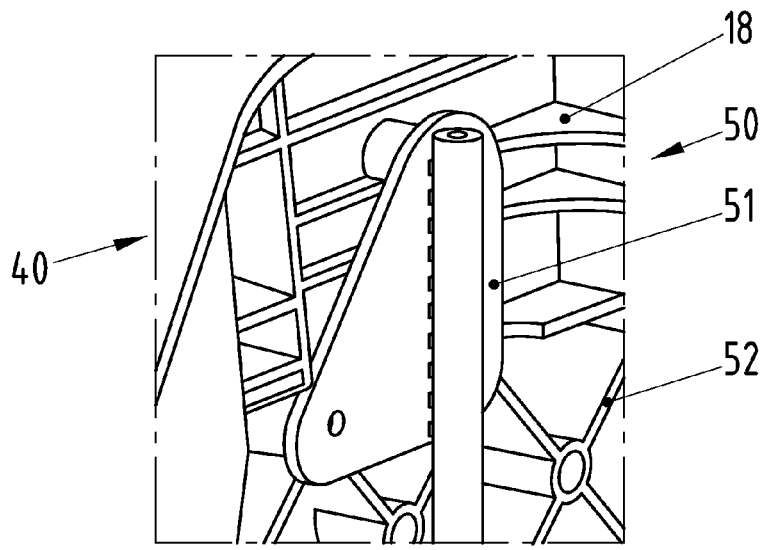
FIG. 4 shows a detail of the locking device in the locked state.

The separator 52 is pre-stressed mechanically by a spring (not illustrated). In addition, a slider 53 is provided and has a first end that acts on the foot of the separator 52 and a second end that is guided into the lateral region of the frame 40 of the head restraint 4. The second end terminates in a mechanical pushbutton key 54. FIGS. 3 and 4 show the locking unit 50 in the locked state.

Figure 5:
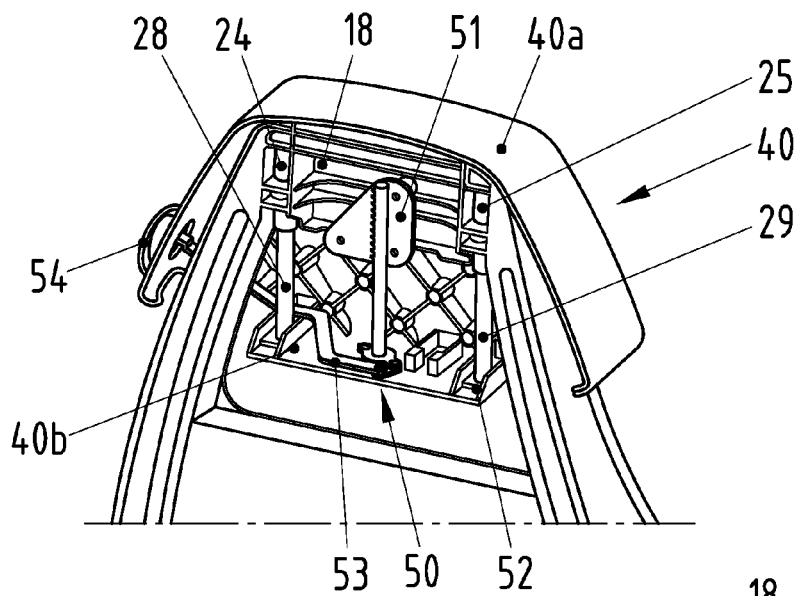
FIG. 5 shows the same view as in FIG. 3, but with the locking device in the unlocked state.
Figure 6:
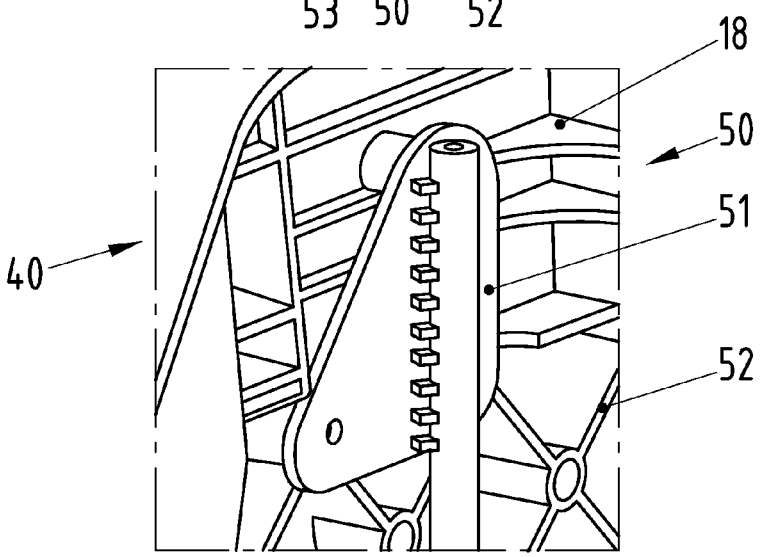
FIG. 6 shows a detail of the locking device in the unlocked state.

The slider 53 is displaced toward the separator 52 when the pushbutton key 54 is pressed by the user. The slider 53 is articulated to the base of the rotatable separator 52. Thus, the separator 52 is pivoted out of the locking position with the latching plate 51 when the pushbutton key 54 is pressed. Therefore, the slider 53 rotates the base of the separator 52 and causes the latches of the separator 52 to pivot out of the holes or depressions in the latching plate 51. As a result, the head restraint 4 is no longer locked and can be displaced into a position desired by the user. FIGS. 5 and 6 show the locking unit 50 in the unlocked state.

The user releases the pushbutton key 54 after this desired position is reached. The separator 52 pivots again into a locking position due to the pre-stressing by the spring. The position selected by the user may not correspond exactly to a locking position if a latch of the separator 52 lies precisely between two depressions or holes in the latching plate 51. However, a slight movement of the head restraint 4 up or down by the user suffices, by means of the mechanical pre-stressing of the separator 52, to reach the next locking position of the locking unit 50.

The head restraint 4 is supported directly on the fixed supporting structure 10 of the backrest 2. As a result, the guiding elements 28, 29 are relieved of load and can be thinner, more cost-effective and lighter than in the case of conventional head restraints.

Forces acting on the head restraint 4 are introduced by the guiding elements 28, 29 via the guiding devices 24, 25 and the transverse strut 18 to the supporting structure 10 of the backrest. The guiding devices 24, 25 provide guidance when applying a load to the head restraint 4 so that the lever arms, which are represented by the guiding elements 28, 29, are reduced in size significantly.

The use of a separator 52, in conjunction with a latching plate 51, results in a plurality of latch and hole combinations in a desired locking position of the locking unit 50. This brings about great stability with regard to undesirable height adjustments of the head restraint 4.

What is claimed is:

1. A backrest for a motor vehicle seat, comprising a head restraint that is height adjustable in a height adjustment direction while being aided by a guide, and a transverse strut that is connected fixedly in an upper region of the backrest, the guide comprising a guiding device that is attached fixedly to the transverse strut and guides a guiding element that is attached to the head restraint and is integrated in the head restraint, the guide further having a locking unit with a latching plate that is fastened to the transverse strut and a separator that is fastened to the head restraint for rotation about a rotation axis extending in the height adjustment direction, the latching plate having holes spaced apart along the height adjustment direction, and the separator having at least one latch projecting transverse to the rotation axis, the latch being selectively engageable in the holes of the latching plate for locking the head restraint on the backrest and being selectively disengageable from the holes in the latching plate by rotating the separator to permit height adjustment of the head restraint.

2. The backrest of claim 1, wherein the separator is mechanically pre-stressed toward a locking position.

3. The backrest of claim 1, wherein said backrest comprises a unitary light metal casting.

4. The backrest of claim 1, wherein the separator is associated with a slider for generating rotation of the separator.

5. The backrest of claim 4, wherein the slider is actuable via a pushbutton key attached to an exterior part of the head restraint.

6. The backrest of claim 1, wherein the guiding device is at least one sliding bearing, and the guiding element is at least one guide rod.

7. The backrest of claim 6, wherein the at least one sliding bearing comprises two sliding bearings and the at least one guide rod comprises two guide rods.

8. The backrest of claim 7, wherein the latching plate is between the sliding bearings and the separator is between the guide rods.

9. A motor vehicle seat, comprising:
a backrest with a transverse strut fixed in an upper region of the backrest, a guiding device and a first locking part attached fixedly to the transverse strut, the first locking part having a plurality of equally spaced holes formed therein and arranged in a linear array; and
a head restraint that is height adjustable along a height adjusting direction with respect to the backrest, a guiding element integrated in the head restraint and being slidably engaged with the guiding device of the backrest for guiding height adjustment movements of the head restraint relative to the backrest, a second locking part mounted in the head restraint for rotation about a rotation axis extending in the height adjusting direction and having at least one latch projecting transverse to the height adjusting direction and being selectively engageable in at least one of the holes of the first locking part and an actuator for selectively rotating the second locking part about the rotation axis and disengaging the first and second locking parts and permitting height adjustment of the head restraint.

10. The motor vehicle seat of claim 9, wherein the at least one latch is one of a plurality of latches that are spaced equally from one another, and a spacing of the latches being equal to a spacing of the equally spaced holes in the latch plate.

11. The motor vehicle seat of claim 9, wherein the guiding device comprises two sliding bearings and the guiding element comprises two guide rods slidably engaged with the sliding bearings.

12. The motor vehicle seat of claim 11, wherein the second locking part is between the guide rods.

13. The motor vehicle seat of claim 9, wherein the headrest further includes a slider connected to the actuator and to the second locking part for generating the rotation of the second locking part.

14. The motor vehicle seat of claim 13, wherein the actuator is a pushbutton key attached to an exterior part of the head restraint.

15. The motor vehicle seat of claim 14, wherein the second locking part is mechanically pre-stressed toward a locking position.

\* \* \* \* \*